US007886061B1

(12) United States Patent
Cheng (10) Patent No.: US 7,886,061 B1
(45) Date of Patent: Feb. 8, 2011

(54) VIRTUAL FOLDERS FOR TRACKING HTTP SESSIONS

(75) Inventor: Chunqing Cheng, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 192 days.

(21) Appl. No.: 12/360,320

(22) Filed: Jan. 27, 2009

Related U.S. Application Data

(63) Continuation of application No. 10/990,347, filed on Nov. 17, 2004, now Pat. No. 7,502,835.

(51) Int. Cl.
*G06F 15/16* (2006.01)
(52) U.S. Cl. .................. 709/227; 709/228; 709/217; 709/223
(58) Field of Classification Search .................. 709/227, 709/228; 715/811
See application file for complete search history.

(56) References Cited

U.S. PATENT DOCUMENTS

| 6,081,837 | A | * | 6/2000 | Stedman et al. ............. 709/219 |
| 6,947,992 | B1 | | 9/2005 | Shachor ....................... 709/228 |
| 6,961,759 | B2 | | 11/2005 | Brown et al. ................. 709/217 |
| 6,964,023 | B2 | | 11/2005 | Maes et al. .................. 715/811 |
| 7,043,455 | B1 | | 5/2006 | Cuomo et al. ................. 705/75 |
| 7,069,560 | B1 | | 6/2006 | Cheyer et al. ............... 719/317 |
| 7,296,076 | B1 | | 11/2007 | Portolani ..................... 709/227 |
| 2003/0115060 | A1 | | 6/2003 | Junqua et al. ............... 704/235 |
| 2005/0010892 | A1 | | 1/2005 | McNair et al. .............. 717/101 |
| 2006/0031442 | A1 | | 2/2006 | Ashley et al. ............... 709/223 |
| 2007/0113269 | A1 | * | 5/2007 | Zhang ........................... 726/4 |

OTHER PUBLICATIONS

U.S. Appl. No. 10/990,347, filed Nov. 17, 2004, entitled "Virtual Folders for Tracking HTTP Sessions," Chunqing Cheng.

* cited by examiner

*Primary Examiner*—Frantz B Jean
(74) *Attorney, Agent, or Firm*—Harrity & Harrity, LLP (57) ABSTRACT

Requests from a client to a network device are authenticated based on a session ID obtained by the network device. Requests may be authenticated by obtaining a session ID value when a session is initiated and transmitting a document to the client that embeds the session ID in such a manner that additional requests to the network device based on the document include the session ID in the request. The additional requests are authenticated based on a determination of whether the session ID is included in the additional requests.

20 Claims, 11 Drawing Sheets

ADMINISTRATOR LOGIN TABLE

| CLIENT IP | USER NAME | USER PASSWORD | LOCAL TIME | SESSION ID |
|---|---|---|---|---|
| 715 | 716 | 717 | 718 | 719 |
| | | | | |

710-1 (top row), 710-P (bottom row)

VIRTUAL FOLDERS FOR TRACKING HTTP SESSIONS

CROSS-REFERENCE TO RELATED APPLICATIONS

This application is a continuation of prior U.S. patent application Ser. No. 10/990,347, filed Nov. 17, 2004, entitled "Virtual Folders for Tracking HTTP Sessions", the entire disclosure of which is hereby incorporated by reference herein.

FIELD OF THE INVENTION

The principles of the invention relate generally to network device management and, more particularly, to configuring network devices.

DESCRIPTION OF RELATED ART

In an increasingly networked world, devices that enable the network are becoming pervasive. Two examples of such network devices are firewalls and routers. A firewall may generally be defined as a network gateway device that protects the resources of a private network from users associated with other networks. An enterprise with an intranet that allows its workers access to the Internet may install a firewall to prevent outsiders from accessing its own private data resources and for controlling what outside resources its own users can access. A router may generally be defined as a network device that determines the next network point to which network packets should be forwarded as the packets progress towards their final destination.

Some entities, such as large corporations, may manage a number of network devices. The devices may occasionally need to be reconfigured to implement different network management policies, network interfaces, or to update or change other device features. Typically, network devices do not include physical interfaces, such as a monitor and keyboard, that are normally associated with personal computers. Accordingly, to manage or reconfigure such devices, network administrators will typically login to the network devices from another computing device, such as a personal computer. A number of different remote login techniques, such as telnet and ssh, have historically been used to access network devices. A more recent technique is to have the network device act as a web server that allows the network administer to login and manage the network device through a web page supported via a protocol such as Hyper-Text Transfer Protocol (HTTP).

Because HTTP is normally a stateless protocol, using HTTP can cause problems when trying to distinguish between multiple different administrator sessions. To some extent, cookies can be used to help distinguish between different sessions. However, cookies are not an optimal solution because, for example, users can turn off the cookie handling ability of a web browser.

SUMMARY OF THE INVENTION

One aspect consistent with the invention is directed to a method for authenticating requests from a client made to a network device. The method includes obtaining a session identification (ID) value when a session is initiated; transmitting a document to the client that embeds the session ID in such a manner that a request to the network device based on the document includes the session ID in the request; and authenticating the request based on a determination of whether the session ID is included in the request.

Another aspect consistent with the invention is a device for authenticating requests from a client made to the device. The device includes a processor and a computer memory operatively coupled to the processor. The computer memory includes programming instructions configured to obtain a session ID when an initial session request is received. The computer memory additionally includes programming instructions configured to transmit a document to the client that includes the session ID in such a manner that additional requests to the network device based on the document include the session ID in the request, and programming instructions configured to authenticate the additional requests based on a determination of whether the session ID is included in the additional requests.

Yet another aspect of the invention is directed to a system that includes a client computing device and a network device communicating with the client computing device via a network using hyper-text transfer protocol (HTTP). The network device authenticates the client device in response to receiving initial login information from the client device for a first session and obtains a first session ID for the first session. Further, the network device transmits a management interface to the client computing device, the management interface embedding the session ID in such a manner that requests to the network device from the management interface include the session ID in the requests. Still further, the network device authenticates the requests based on the session ID included in the requests.

Yet another aspect of the invention is directed to a method including receiving a request from a client device relating to a HTTP communication session, determining whether the received request includes an embedded session ID that was created specifically for the communication session, and granting the request when the received request includes the session ID.

Yet another aspect of the invention is directed to a method for authenticating requests from a client made to a network device. The method includes obtaining a session identification (ID) value when a session is initiated; recording a client local time when the session is initiated; transmitting a document to the client that embeds the session ID in such a manner that a request to the network device based on the document includes the session ID in the request; and authenticating the request based on a determination of whether the session ID is included in the request and based on whether the session ID included in the request corresponds to the client local time and to source/destination information relating to the client or the network device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a user interface may be presented to a user via an HTTP interface in which a "virtual folder" is created by a web server for each new HTTP session. Each virtual folder may be based on a session identification (ID) value that is used to uniquely identify different HTTP sessions.

EXEMPLARY SYSTEM OVERVIEW

Figure 1:
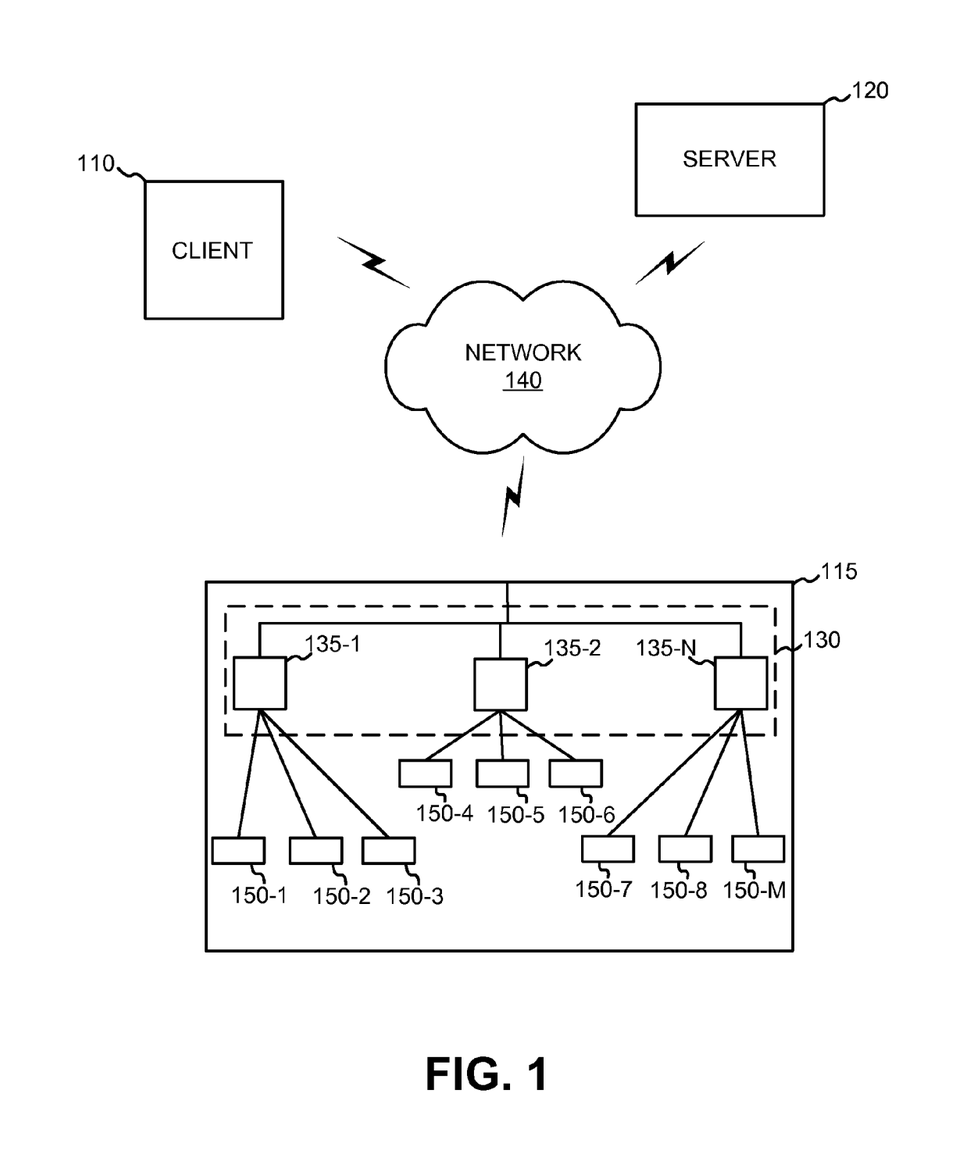
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as client 110, proprietary network 115 (e.g., a corporate network), and server device 120. Client 110, proprietary network 115, and server 120 may connect to one another via a network 140. Network 140 may include a local area network (LAN), a wide area network (WAN), a telephone network, such as the Public Switched Telephone Network (PSTN), an intranet, the Internet, or a combination of networks. A single client 110, proprietary network 115, and server 120 have been illustrated as connected to network 140 for simplicity. In practice, there may be more clients, servers, and proprietary networks.

Proprietary network 115 may be, for example, a corporate network that connects clients 150-1 to 150-M (referred to collectively as clients 150) to network 140 via a gateway 130. A gateway can generally be thought of as a network point that acts as an entrance to another network. Gateway 130 may include a number of network devices, such as firewall devices 135-1 through 135-N (referred to collectively as firewall devices 135). Clients 150 of proprietary network 115 may connect to network 140 through firewall devices 135 of gateway 130.

Clients 110/150 may include a device such as a wireless telephone, a personal computer, a personal digital assistant (PDA), a lap top, or another type of computation or communication device, a thread or process running on one of these devices, and/or an object executable by one of these devices. Server 120 may include a server device that processes, searches, and/or maintains information and provides such information to client 110 and clients 150.

Figure 2:
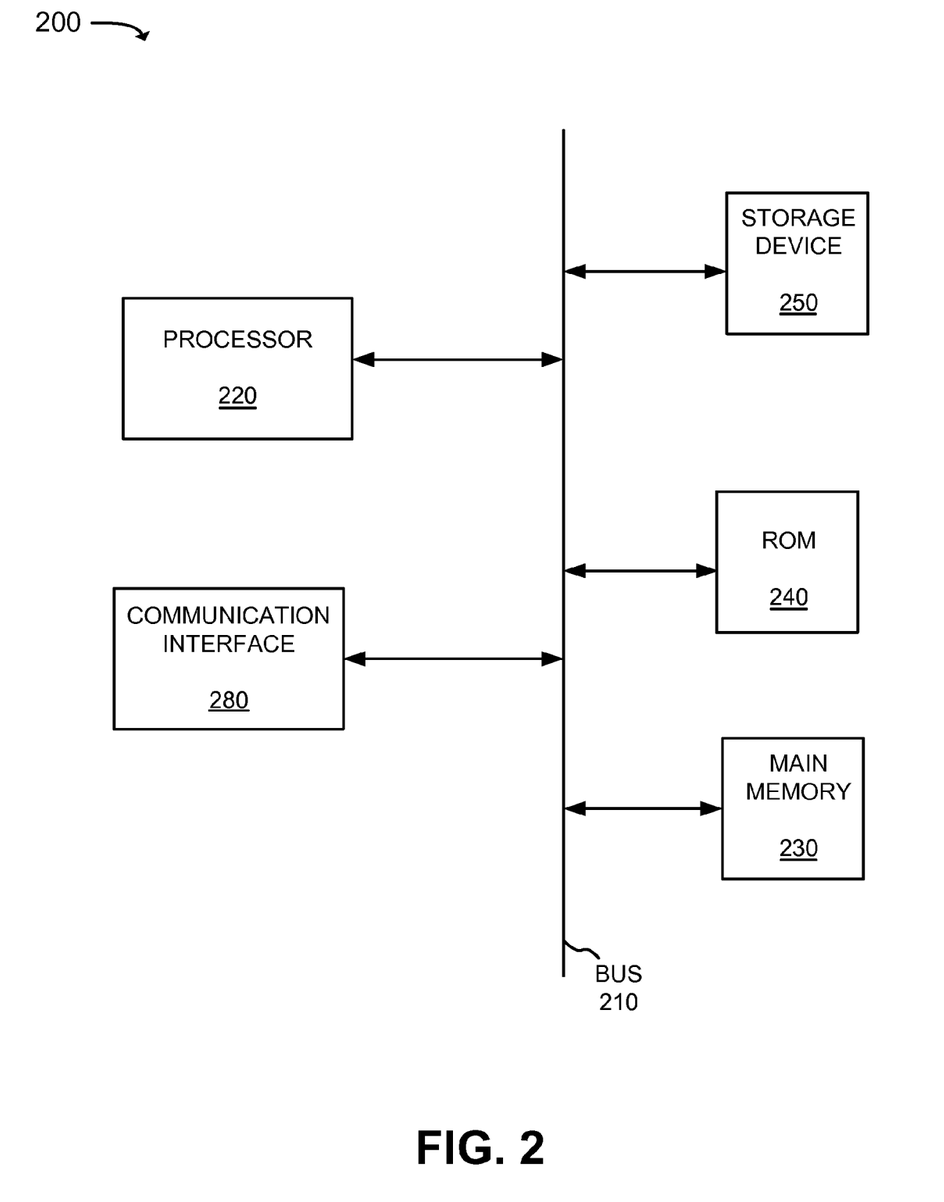
FIG. 2 is an exemplary diagram of a client, server, or other network device, such as a firewall or a router.

FIG. 2 is an exemplary diagram of one of clients 110/150, server 120, or other network device, such as a firewall 135 or a router, illustrated as computing device 200. Computing device 200 may include a bus 210, a processor 220, a main memory 230, a read only memory (ROM) 240, a storage device 250, and a communication interface 280. Bus 210 may include conductors that permit communication among the components of computing device 200.

Processor 220 may include conventional processors, microprocessors, or processing logic that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Communication interface 280 may include any transceiver-like mechanism that enables computing device 200 to communicate with other devices and/or systems. For example, communication interface 280 may include mechanisms for communicating with another device or system via a network, such as network 140.

Computing device 200 may implement a number of functions, described in more detail below, using software instructions read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Configuration of Network Device

Figure 3:
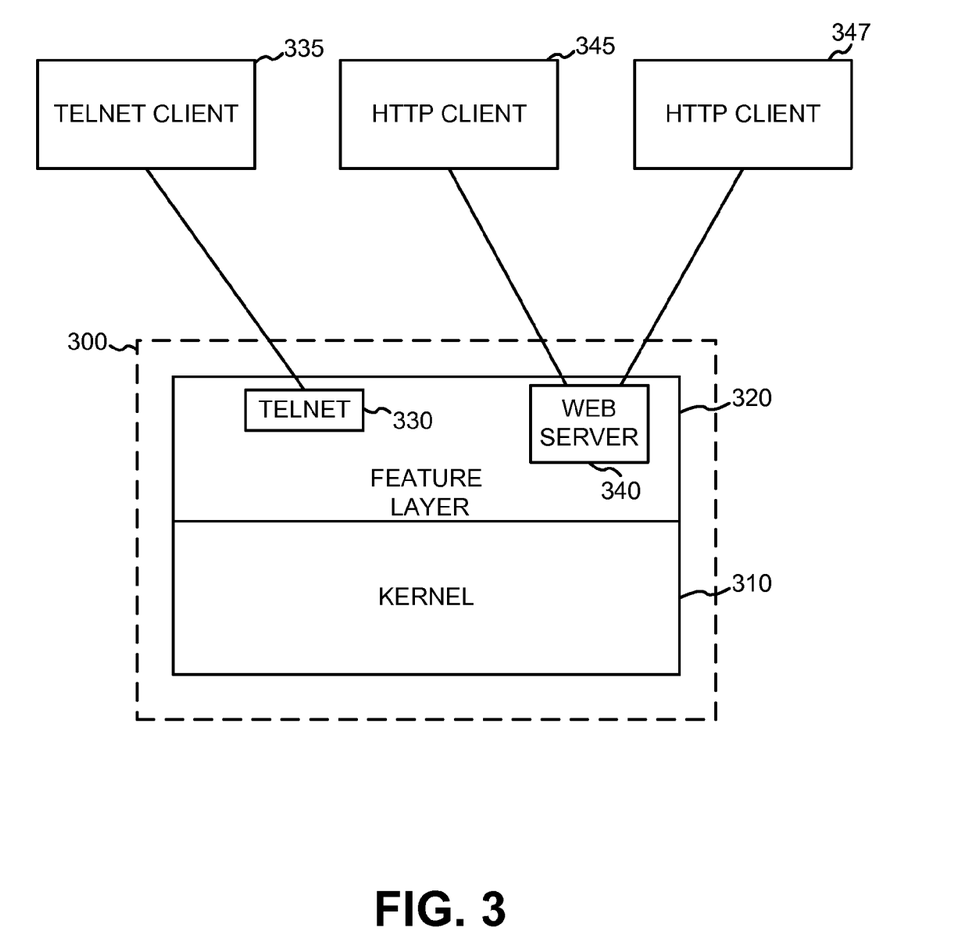
FIG. 3 is a diagram conceptually illustrating software layers of a network device.

FIG. 3 is a diagram conceptually illustrating software layers of a network device 300, such as a firewall 135 or a router. Processor 220 of network device 300 may execute a kernel layer 310 and an application or feature layer 320 may be implemented in the context of kernel layer 310. Many of the basic features of the network device may be implemented in feature layer 320. For example, network administrators may login to the network device via processes running in feature layer 320. A telnet process 330 and a web server process 340 are particularly shown in FIG. 3. Through telnet process 330, a network administrator, such as a network administrator at client 335, may login to the network device via the telnet protocol. Through web server process 340, a network administrator, such as a network administrator at client 345, may login to the network device using a graphical interface implemented via the HTTP (or HTTPS) protocol. Additional client devices, such as client 347, or additional sessions from the same client device 345 may also login through web server process 340. Clients 345 and 347 may include web browsing programs that display graphical user interfaces received from web server process 340. The graphical user interfaces may be used to modify or configure the network device.

Figure 4A:
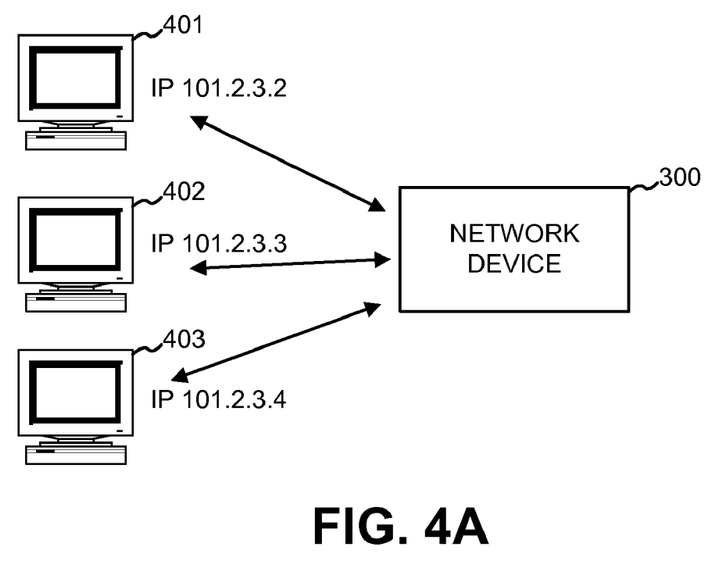
FIGS. 4A-4C are diagrams illustrating typical configuration scenarios of the network device shown in FIG. 3.
Figure 4B:
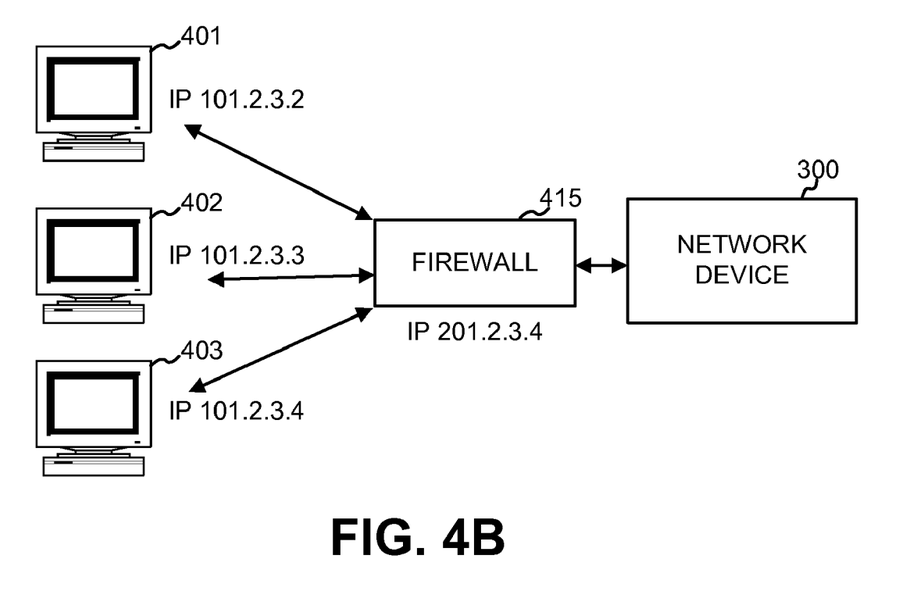
Figure 4C:
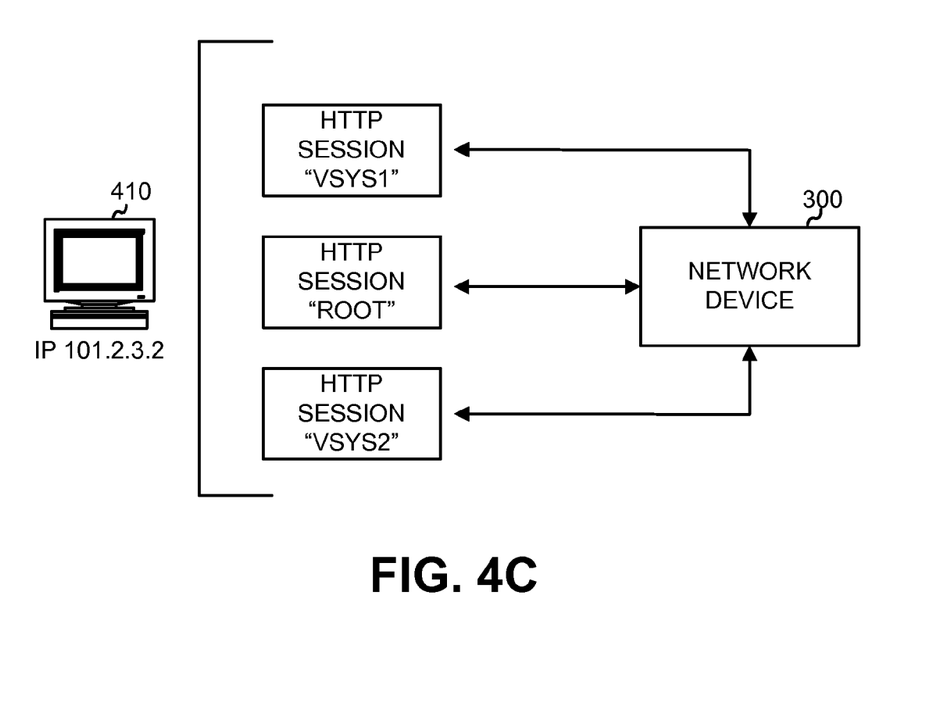

FIGS. 4A-4C are diagrams illustrating typical configuration scenarios of network device 300. In all the scenarios, assume that network administrators connect to the network device through web server process 340.

In FIG. 4A, three clients 401, 402, and 403 connect to network device 300. Each of clients 401, 402, and 403 may be associated with and seen by network device 300 as having a different Internet Protocol (IP) address, shown as IP addresses 101.2.3.2, 101.2.3.3, and 101.2.3.4, respectively. In this scenario, web server process 340 of network device 300 could concurrently host HTTP sessions with each of clients 401, 402, and 403 and distinguish between the different sessions based on the different IP addresses and administrator login names.

In FIG. 4B, the three clients 401, 402, and 403 connect to network device 300 through an intermediary firewall 415. Each of clients 401, 402, and 403 may be associated with a different IP address. However, firewall 415 may perform network address translation so that each of clients 401-403 appears to devices outside of firewall 415 as having a single IP address (e.g., IP address 201.2.3.4). Accordingly, network device 300, when hosting each of the clients via an HTTP session, is not able to distinguish between the different clients based on IP address. From the point of view of network device 300, all of clients 401-403 appear to be associated with the same IP address. Network device 300 could potentially distinguish between clients 401, 402, and 403 based on different administrator login names. However, if a single administrator logs-in from multiple computers, network device 300 may conventionally have trouble distinguishing between the sessions at the different computers.

In FIG. 4C, a single client 410 connects to network device 300. In this situation, however, assume that the network administrator at client 410 opens three separate sessions with network device 300, labeled as VSYS1, ROOT, and VSYS2. Each session may be opened in a different instance of a web browser. Each separate session may have different access and configuration privileges on network device 300. The network administrator may, for instance, login as VSYS1 using a first login name and password, login as VSYS2 using a second login name and password, and login as ROOT using a third login name and password. From the point of view of network device 300, each of the sessions are associated with the same IP address and potentially the same administrator name, which, with conventional HTTP techniques for handling user authentication and session management, can cause difficulty in logically separating the three sessions (VSYS1, ROOT, and VSYS2) at network device 300. This can be problematic as, for instance, one of the sessions, such as VSYS1, may be able to view or modify attributes of network device 300 to which it should not have access.

Figure 5:
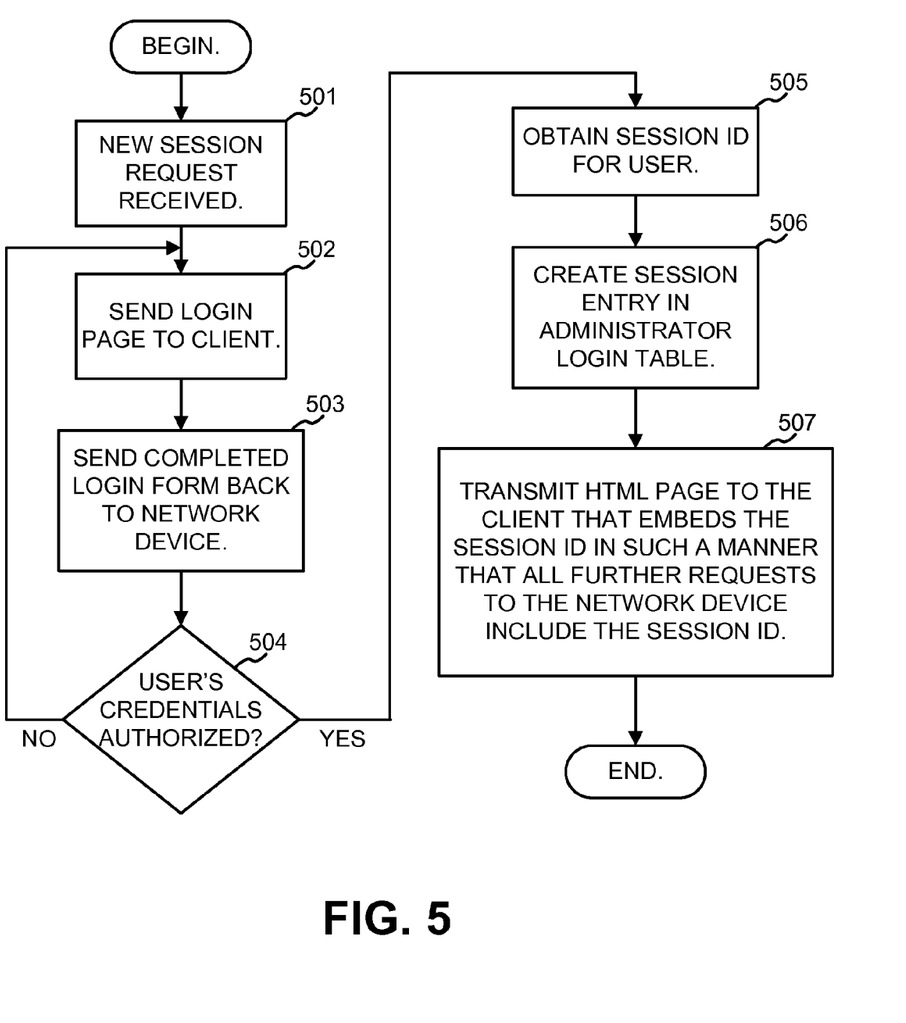
FIG. 5 is a flowchart illustrating exemplary operations for managing a network device consistent with aspects of the invention.

FIG. 5 is a flowchart illustrating exemplary operations for managing network device 300 consistent with aspects of the invention. The sessions are managed such that network device 300 can distinguish between the different sessions without using cookies, relaying an IP address, or relaying an administrator login name.

Figure 6:
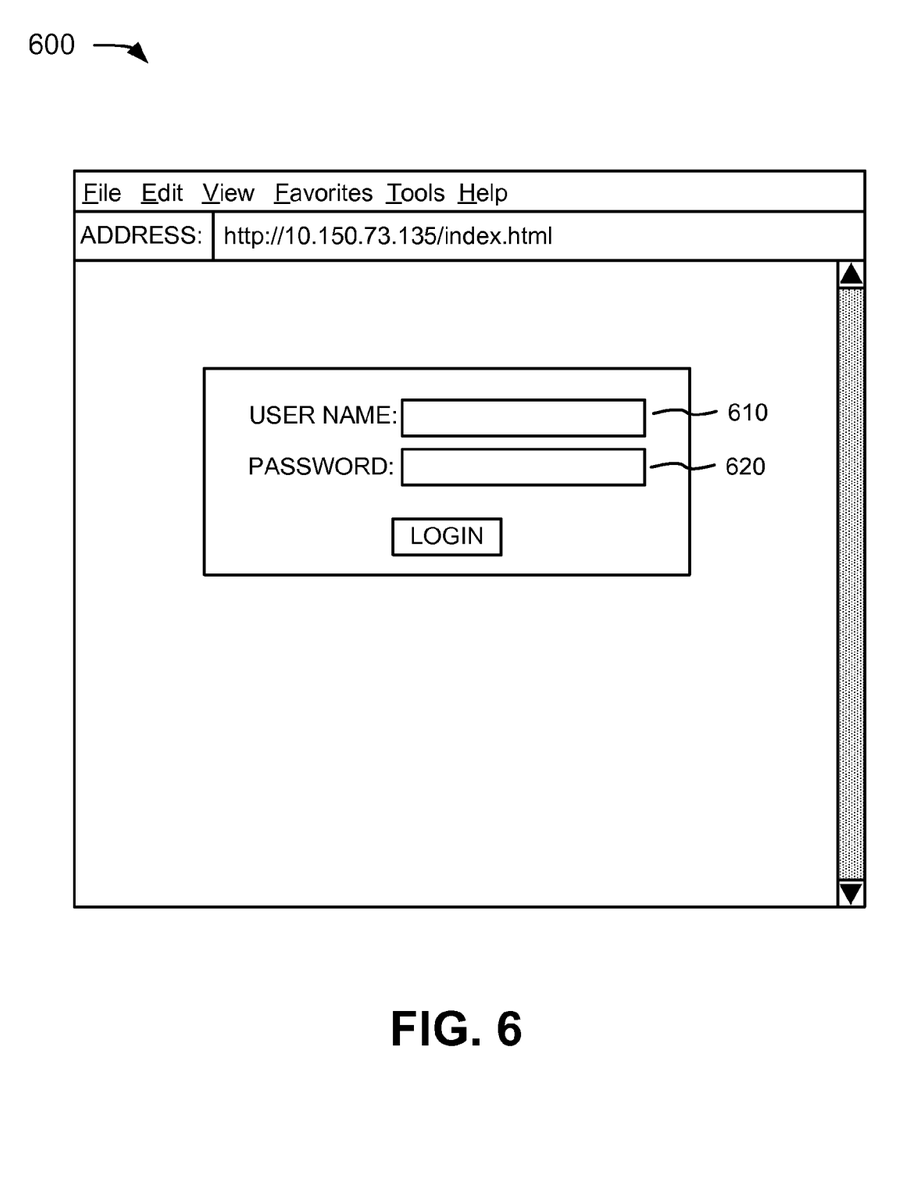
FIG. 6 is a diagram illustrating an exemplary login page that may be displayed at a requesting client in response to receiving a request for a new session.

A session with network device 300 may begin by a client device, such as client 345, contacting web server process 340 to initiate a session (act 501). The request may be an HTTP request for a login page. In response, web server process 340 may send back a login page to client 345 (act 502). FIG. 6 is a diagram illustrating an exemplary login page 600 that may be displayed at the requesting client in response to receiving the request for a new session. The login page may be displayed in a web browser program at the client and may include a user name field 610 and a password field 620. In addition to user name field 610 and password field 620, the login page may include additional fields, such as a hidden local time field, which requests that the client send back the client's local time. The user may fill in the user name field 610, the password field 620, and submit those fields back to web server process 340, possibly with other fields, such as the local time (act 503). In response, web server process 340 may determine whether the user's credentials are authorized (i.e., that the login name and password are authorized) (act 504). If not, the client may again be presented with login page 600 (acts 504, 502).

When the user's credentials are authorized, however, a session ID may be obtained for the user (act 505). The session ID may be a unique identifier for the session. In one implementation, the session ID is a globally unique value. As an example of the generation of a session ID, network device 300 may generate multiple random numbers, which may be converted into the session ID, such as by hashing the random numbers to obtain a session ID of a fixed length, such as a 39 byte value. Alternatively, the session ID may be selected from a list of available session IDs. The obtained session ID, along with other information relating to the session, may be saved by network device 300 in a table (act 506). The session ID may be large enough to be essentially unique.

Figure 7:
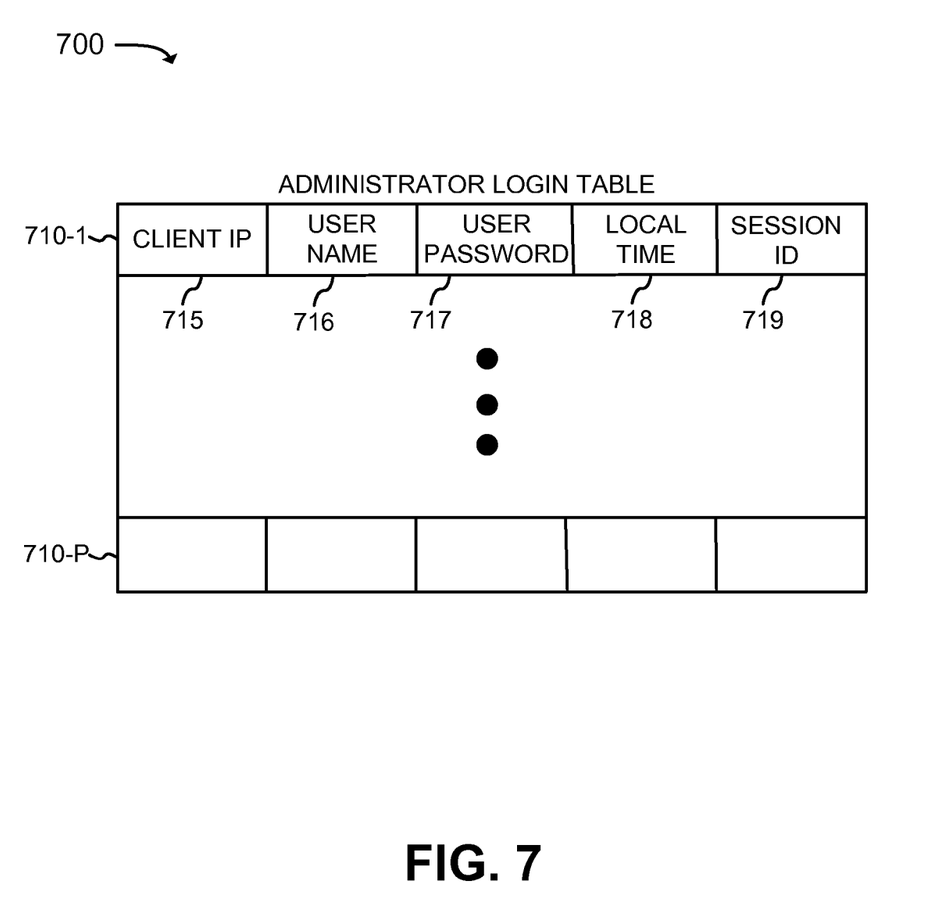
FIG. 7 is a diagram illustrating an exemplary administration login table.

FIG. 7 is a diagram illustrating an exemplary table 700, such as the table created in act 506. Table 700 will be called administration login table 700 herein. Table 700 may include entries 710-1 through 710-P (collectively, entries 710) for each session being hosted by web server process 340. Each entry 710 may include a number of fields. Taking entry 710-1 as an exemplary entry, this entry may include a field for storing an IP address 715 of the client and/or other source/destination information (e.g., source IP address, destination IP address, destination port identifier), a field for storing the user login name 716 associated with the session, a field for storing a password 717 associated with the session, a field for storing the local authorization time 718 returned from the client to network device 300, and a field for storing the session ID 719 created in act 505. Web server process 340 may next transmit a hyper-text markup language (HTML) page, such as the main management page for managing network device 300, to the client (act 507). Consistent with an aspect of the invention, session ID 719 is associated with the page such that session ID 719 will be returned to web server process 340 whenever an additional HTTP request, such as an HTTP "GET" request, is sent back to web server process 340. Web server process 340 may then use the session ID to uniquely identify the session without requiring login name (or other user credential information) to be embedded in every request or without using browser cookies.

Figure 8:
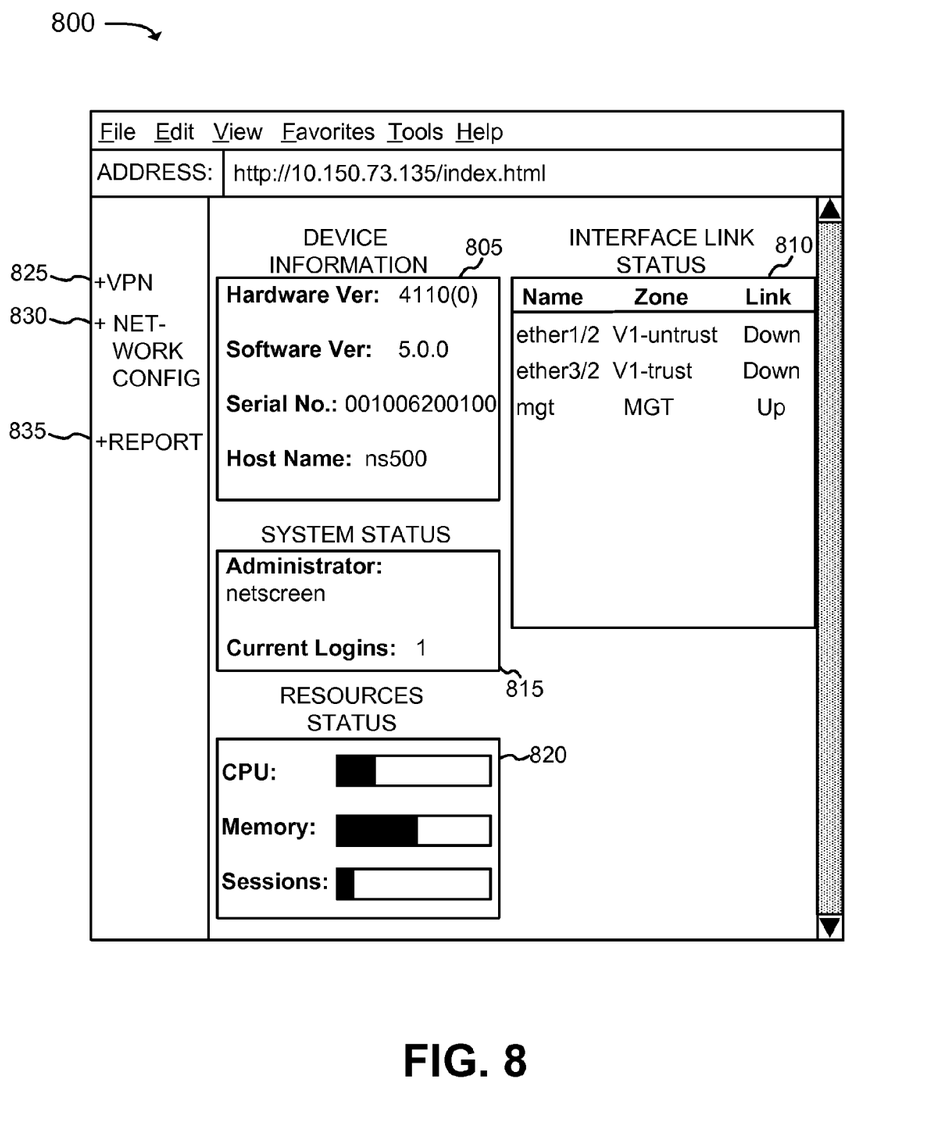
FIG. 8 is a diagram of a web page showing an exemplary management interface for a network device.

FIG. 8 is a diagram of a web page showing an exemplary management interface 800 for a network device, such as the initial HTML page transmitted to the client in act 507. Management interface 800 may generally display information about network device 300 as well as let administrators configure network device 300. For example, management interface 800 may display information relating to general device information 805, interface link status 810, system status 815, and resource status 820. Separate graphical links may be provided for taking the administrator to additional management interfaces. For instance, there may be a VPN configuration link 825, a network configuration link 830, and a reports link 835.

In one implementation, web server process 340 uses the session IDs to uniquely identify sessions by creating a "virtual folder" for each session. This virtual folder concept will now be described in more detail.

Figure 9:
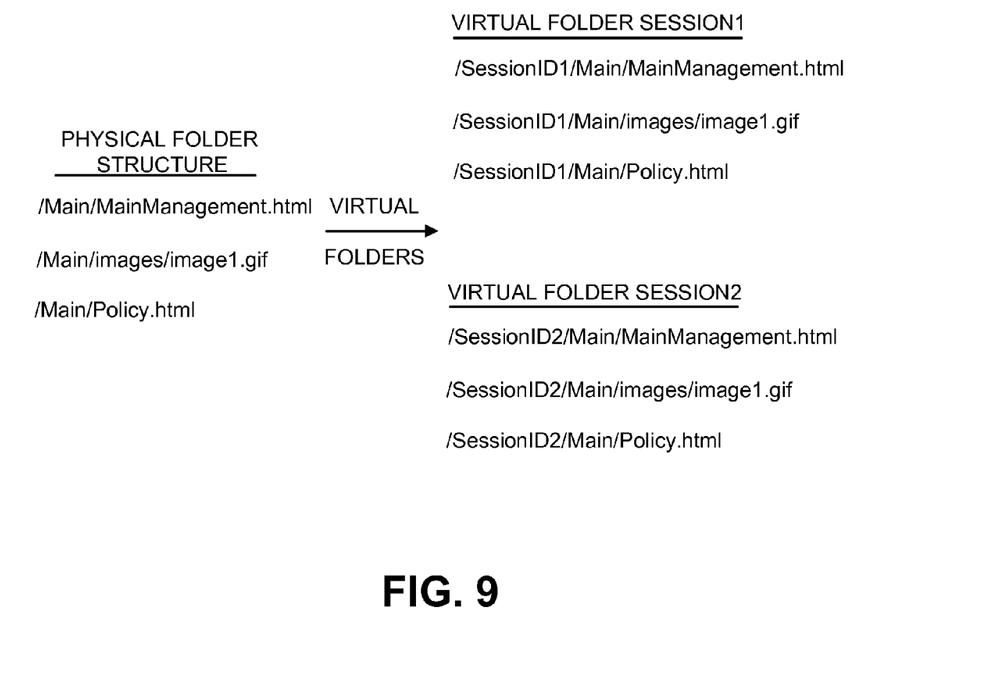
FIG. 9 is a diagram conceptually illustrating the concept of a virtual folder.

FIG. 9 is a diagram conceptually illustrating the concept of a virtual folder. Assume, for this example, that the HTML pages that define the user interface for a particular device include the pages "MainManagement.html" and "Policy.html" which are associated with the folder "/Main/" in network device 300. Further, assume that "MainManagement.html" includes an image ("image1.gif") located in the sub-folder "/images/." Thus, in this example, the files that define the set of HTML pages for the network device are located in the base folder "/Main/" and the links within the pages to other HTML pages (e.g., a link in MainManagement.html to Policy.html) may be relative links based on the folder "/main/."

Each session established with web server process 340 may be thought of as being with a set of files in a virtual folder defined by the session ID. In FIG. 9, for example, two sessions are illustrated, Session1 (associated with SessionID1) and Session2 (associated with SessionID2). The files that define the HTML web pages are exchanged between network device 300 and the client as links that include the session ID. Accordingly, when the client requests an HTML page, the request sent back to web server process 340 will include the link to the virtual folder for the session, which includes the session ID for the session. For example, the request for MainManagement.html may be a HTTP GET request for the resource located at "http://10.2.3.4/SessionID1/main/MainManagement.html". In this request, "10.2.3.4" specifies the IP address for the network device 300 and SessionID1 is the session ID for the session. Web server process 340 may extract the session ID from the request and use the remainder of the request to access the HTML page as normal (assuming the session ID is valid).

In the just-described virtual folder technique for transmitting session IDs, the HTML pages served from network device 300, such as management interface 800, will generally not change and do not need any special consideration when being designed. In alternate implementations, other techniques can be used for transmitting session IDs to web server process 340. In one implementation, for example, the HTML pages for the web site are authored in such a way that every HTTP request is associated with a query string that contains the session ID. Web server process 340 may then extract the session ID from the query string and appropriately respond to the request. With this approach, each HTML page may be dynamically customized for each particular session before the page is transmitted to the client to include the appropriate session ID information as a query string associated with all HTML anchors within the page.

In alternate implementations, still other techniques, in addition to virtual folders and query strings could be used to transmit session IDs to web server process 340. For example, hidden fields may be dynamically embedded within forms in the web pages to transmit the session IDs back to web server process 340.

Figure 10:
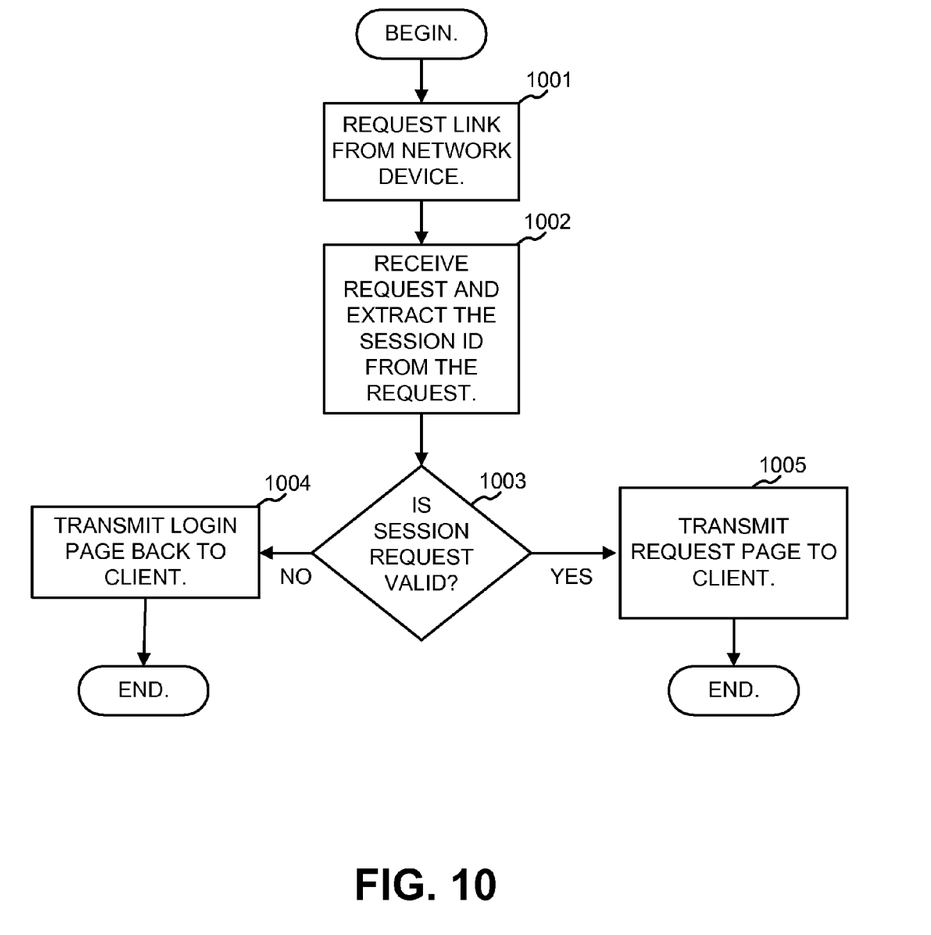
FIG. 10 is a flow chart illustrating exemplary operations by which a network device interacts with clients after a successful session login.

FIG. 10 is a flow chart illustrating exemplary operations by which network device 300 interacts with clients after a successful session login. Processing may begin with a client requesting a link from or transmitting information back to web server process 340 (act 1001). For example, assume that the client requests link 825 from management interface 800. Because the request is based on management interface 800 (or another document received from network device 300), the request will include, in addition to including the substantive context of the request, the session ID of the particular session. In other words, because management interface 800 was created/transmitted to the client in such a way that it essentially embeds the session ID within itself, all requests based on management interface 800 include the session ID. As discussed previously, the session ID may be embedded using a technique such as virtual folders, a query string, or in a hidden form field.

Web server process 340 may receive the request and extract the session ID (act 1002). The session ID may then be checked to determine if the session request is valid (act 1003). In one implementation, the session ID may be determined to be valid by matching the received session ID and the source/destination information associated with the request to the session ID with source/destination information stored in table 700 (such as the client IP address, or with other information such as a destination IP address, source port, or destination port). If the session ID matches the source/destination information, the session is determined to be valid. If the session is not valid, the initial login page may be sent back to the client (acts 1003 and 1004). If, however, the session is valid, the requested page is sent to the client (acts 1003 and 1005). In other words, the session ID is used to authenticate each request the client transmits to network device 300. Using a stolen session ID would, in general, fail to gain access.

In one implementation, for a valid session, the web page sent back to the client may be authored such that the client browser additionally checks to determine whether the user name and session initiation time match the user name 716 and local time 718 stored in table 700. More particularly, each session ID in network device 300 has a finite life of predetermined value in the table 700. Network device 300 may renew the session ID's life each time a valid request is made from client. Each request is then compared to the life value stored in the table 700 to determine whether the session has gone stale. If so (i.e., if greater than a predetermined time period, such as 10 minutes, has elapsed since the last request), the user may be logged out and required to log back in before continuing. For each request, the instructions are also given to the client device to determine whether the value in field 718 of the table 700 matches the session initiation time, if not, the user is required to log in again (start another session) before continuing. If one walks away from the session, (i.e., use the same browser window to view another site), one cannot continue the current session further; the session is prematurely terminated. The same logic also prevents a stolen ID from gaining access the web server process (340).

Based on the operations shown in FIG. 10, the session ID is used to track HTTP sessions without using cookies or without relying on unique IP addresses or user names.

Although primarily described in the context of a network device, the concepts described herein could more generally be applied to any stateless protocol session.

CONCLUSION

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code or hardware design—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A method performed by a network device, comprising:
concurrently hosting a plurality of different communication sessions;
generating, after a session login, a session identification (ID) for each of the plurality of communication sessions;
storing the session IDs;
embedding each of the session IDs in a respective one of a plurality of documents, each of the plurality of documents corresponding to a particular one of the plurality of communication sessions;
transmitting the documents as part of the particular one of the plurality of communication sessions; and
distinguishing received requests associated with the particular one of the plurality of communication sessions based on the session ID included in the requests, without using at least one of cookies, a login name, credential information, or an Internet protocol address related to the requests.

2. The method of claim 1, further comprising:
distinguishing the received requests without using at least two of cookies, a login name, credential information, or an Internet protocol address.

3. The method of claim 1, further comprising:
distinguishing the received requests without using at least three of cookies, a login name, credential information, or an Internet protocol address.

4. The method of claim 1, further comprising:
distinguishing the received requests without using any of cookies, a login name, credential information, or an Internet protocol address.

5. The method of claim 1, where the plurality of different communication sessions comprise stateless protocol sessions.

6. The method of claim 1, where concurrently hosting a plurality of different communication sessions comprises:
communicating with a plurality of clients that appear to the network device as having a single Internet protocol address.

7. The method of claim 1, where concurrently hosting a plurality of different communication sessions comprises:
communicating with a single administrator using at least one of different login names or different passwords for separate ones of the different communication sessions.

8. The method of claim 1, where embedding each of the session IDs comprises:
using at least one of a virtual folder, a query string, or a hidden form field.

9. The method of claim 1, where transmitting the documents comprises:
transmitting at least one of a hyper-text markup language (HTML) page or a user interface.

10. The method of claim 1, where distinguishing received requests comprises:
extracting the session ID from a received request, and
matching the extracted session ID to one of the stored session IDs to determine if the extracted session ID is valid.

11. A computer-readable memory device that stores instructions executable by at least one processor, comprising:
instructions to generate, after a session login, a session identification (ID) for a communication session;
instructions to store the session ID with a plurality of other session IDs;
instructions to embed the session ID in a document;
instructions to transmit the document as part of the communication session;
instructions to receive, during the communication session, a request based on the document;
instructions to determine whether the session ID is included in the request; and
instructions to grant the request, without using at least one of cookies, a login name, credential information, or an Internet protocol address related to the request, when the session ID is included the request.

12. The computer-readable memory device of claim 11, where the instructions to grant the request comprise:
instructions to grant the request, without using at least two of cookies, a login name, credential information, or an Internet protocol address related to the request, when the session ID is included the request.

13. The computer-readable memory device of claim 11, where the instructions to grant the request comprise:
instructions to grant the request, without using at least three of cookies, a login name, credential information, or an Internet protocol address related to the request, when the session ID is included the request.

14. The computer-readable memory device of claim 11, where the instructions to grant the request comprise:
instructions to grant the request, without using any of cookies, a login name, credential information, or an Internet protocol address related to the request, when the session ID is included the request.

15. The computer-readable memory device of claim 11, where the communication session comprises a stateless protocol session.

16. The computer-readable memory device of claim 11, where instructions to embed the session ID comprises:
instructions to use at least one of a virtual folder, a query string, or a hidden form field.

17. The computer-readable memory device of claim 11, where instructions to transmit the document comprises:
instructions to transmit a hyper-text markup language (HTML) page.

18. The computer-readable memory device of claim 11, where instructions to transmit the document comprises:
instructions to transmit a management interface.

19. The computer-readable memory device of claim 11, where the instructions to determine whether the session ID is included in the request comprises:
instructions to extract the session ID from the request, and
instructions to compare the extracted session ID to the stored session IDs to determine a match.

20. A system comprising:
means for concurrently hosting a plurality of different communication sessions;
means for generating, after a session login, a session identification (ID) for each of the plurality of communication sessions;
means for storing the session IDs;
means for embedding each of the session IDs in a respective one of a plurality of documents, each of the plurality of documents corresponding to a particular one of the plurality of communication sessions;

means for transmitting the documents with the embedded session IDs as part of the particular one of the plurality of communication sessions; and means for distinguishing received requests associated with the particular one of the plurality of communication sessions based on session IDs included in the requests and the stored session IDs, without using at least one of cookies, a login name, credential information, or an Internet protocol address related to the received requests.

* * * * *